US009676555B2

(12) United States Patent
Siemer

(10) Patent No.: US 9,676,555 B2
(45) Date of Patent: Jun. 13, 2017

(54) CO-FORMED CONVEYOR BELT APPARATUS AND PROCESS

(71) Applicant: F.N. Sheppard & Company, Erlanger, KY (US)

(72) Inventor: Wayne A. Siemer, Edgewood, KY (US)

(73) Assignee: F.N. Sheppard & Company, Erlanger, KY (US)

(*) Notice: Subject to any disclaimer, the term of this patent is extended or adjusted under 35 U.S.C. 154(b) by 0 days.

(21) Appl. No.: 14/799,653

(22) Filed: Jul. 15, 2015

(65) Prior Publication Data

US 2016/0304283 A1    Oct. 20, 2016

Related U.S. Application Data

(60) Provisional application No. 62/148,958, filed on Apr. 17, 2015.

(51) Int. Cl.
*B65G 15/34* (2006.01)
*B65G 15/42* (2006.01)
(Continued)

(52) U.S. Cl.
CPC .............. *B65G 15/34* (2013.01); *B29D 29/06* (2013.01); *B65G 15/42* (2013.01); *F16G 1/28* (2013.01); *B29K 2075/00* (2013.01); *B29K 2105/0809* (2013.01); *B29K 2105/106* (2013.01); *B65G 15/36* (2013.01); *B65G 15/64* (2013.01); *B65G 2207/48* (2013.01)

(58) Field of Classification Search
CPC ........ B65G 15/34; B65G 15/42; B65G 15/64; F16G 1/28; B29D 29/06

USPC ............... 198/844.1, 845, 847; 156/137, 139
See application file for complete search history.

(56) References Cited

U.S. PATENT DOCUMENTS 4,058,424 A * 11/1977 Breher .................. B29D 29/08
                                                     156/137
4,066,732 A *  1/1978 Redmond, Jr. ........ B29D 29/08
                                                     156/138

(Continued)

FOREIGN PATENT DOCUMENTS

CN      102234007 A    11/2011
DE       1729016 A1     6/1971
(Continued)

OTHER PUBLICATIONS

European Patent Office, International Search Report and Written Opinion for International Patent Application No. PCT/US2015/056377, dated Apr. 26, 2016, 17 pages.

(Continued)

*Primary Examiner* — Douglas Hess
(74) *Attorney, Agent, or Firm* — Wood Herron & Evans LLP

(57) ABSTRACT

A co-formed composite conveyor belt having a flat belt component, a plurality of reinforcing cords, a timing component, and a reinforced netting component, all co-formed together in one integral belt having a single pitch line. The timing component includes first and second adjacent rows of obliquely angled teeth. Additional, optional material layers can be co-formed therewith including for wear resistance and conveying functions. Co-forming apparatus and methods are disclosed.

15 Claims, 3 Drawing Sheets

(51) Int. Cl.
  *B29D 29/06* (2006.01)
  *F16G 1/28* (2006.01)
  *B65G 15/36* (2006.01)
  *B65G 15/64* (2006.01)
  *B29K 75/00* (2006.01)
  *B29K 105/08* (2006.01)
  *B29K 105/10* (2006.01)

(56) References Cited

U.S. PATENT DOCUMENTS

| | | | | |
|---|---|---|---|---|
| 4,515,743 A * | 5/1985 | Breher | ................ | B29C 43/222 |
| | | | | 156/140 |
| 4,681,558 A * | 7/1987 | Rausch | ................ | B29D 29/08 |
| | | | | 156/137 |
| 5,209,705 A | 5/1993 | Gregg | | |
| 5,219,505 A * | 6/1993 | Kaiser | ................ | B29D 29/06 |
| | | | | 156/140 |
| 5,392,831 A * | 2/1995 | Thomas | ................ | F16G 1/28 |
| | | | | 156/138 |
| 5,421,789 A | 6/1995 | Gregg | | |
| 5,609,706 A * | 3/1997 | Benedict | ................ | B24D 3/20 |
| | | | | 156/137 |
| 5,911,307 A * | 6/1999 | Kraft | ................ | B65G 15/64 |
| | | | | 198/846 |
| 6,183,582 B1 | 2/2001 | Gregg | | |
| 6,406,576 B1 * | 6/2002 | Benedict | ................ | B24D 3/20 |
| | | | | 156/137 |
| 6,406,577 B1 * | 6/2002 | Benedict | ................ | B24D 3/20 |
| | | | | 156/137 |
| 6,645,334 B1 * | 11/2003 | Smith | ................ | B29D 30/3007 |
| | | | | 152/532 |
| 6,672,983 B2 | 1/2004 | Mohr et al. | | |
| 6,863,761 B2 * | 3/2005 | Knutson | ................ | B29D 29/08 |
| | | | | 156/137 |
| 7,101,296 B1 | 9/2006 | Cass et al. | | |
| 8,012,282 B2 * | 9/2011 | Takahashi | ................ | B29D 29/10 |
| | | | | 156/137 |
| 8,357,065 B2 * | 1/2013 | Duke, Jr. | ................ | B29D 29/08 |
| | | | | 474/205 |
| 8,871,329 B2 * | 10/2014 | Yoshida | ................ | F16G 1/28 |
| | | | | 428/167 |
| 9,127,746 B2 * | 9/2015 | Onita | ................ | F16G 5/20 |
| 2002/0119854 A1 | 8/2002 | Mohr et al. | | |
| 2008/0047656 A1 | 2/2008 | Fickenwirth et al. | | |
| 2010/0018842 A1 | 1/2010 | Gundlach | | |

FOREIGN PATENT DOCUMENTS

| | | |
|---|---|---|
| DE | 102005056374 A1 | 5/2007 |
| GB | 1500909 A | 2/1978 |
| WO | 2009109434 A1 | 9/2009 |
| WO | 2014069000 A1 | 5/2014 |

OTHER PUBLICATIONS

European Patent Office, Invitation to Pay Additional Fees and, Where Applicable, Protest Fee (Annex—Communication Relating to the Results of the Partial International Search), Feb. 2, 2016, 7 pgs.

\* cited by examiner

CO-FORMED CONVEYOR BELT APPARATUS AND PROCESS

PRIORITY CLAIM

Applicant claims the benefit of the filing date of Apr. 17, 2015 of U.S. Provisional Patent Application Ser. No. 62/148,958, which application is herewith expressly incorporated herein by reference as if fully set forth herein.

FIELD OF THE INVENTION

This invention relates to conveyor belts and more particularly to composite conveyor belts of improved structure and function, and to methods for making such belts.

BACKGROUND OF THE INVENTION

Composite conveyor belts have been used in the past where the belt includes a plurality of components such as, for example, a flat belt and a toothed timing component running the length of the belt and preferably centrally located, and other components. The flat belt portion is constructed to convey objects while the timing component typically comprises a plurality of laterally extending teeth for operative cooperation with a complimentary configured drive pulley or timing drive wheel. Rotation of the wheel drives the composite belt along operative and return runs and around and along the drive wheel and any idler or support rollers, tails stocks or the like. Many such belts include additional components such as layers of wear resisting material on the timing component side of the belt.

Such prior belts typically and inherently present at least two pitch lines defined by the belt components. For example, the flat belt component may present a first one pitch line while the toothed timing component presents yet another second pitch line spaced away from the first pitch line. Alternatively, additional wear or other function layers present other pitch lines.

When such a belt is entrained around a drive wheel or tail stock, for example, the presence of two or more pitch lines can urge or bias the respective belt components (with respect to each respective pitch line) in a manner which can cause undue belt wear, observed as delamination, of one component from the other. This undesirable wear and separation increases as the diameter of the drive wheel and or tail stock, for example, decreases. And in some instances, depending on the materials of the belt components, diameter of the drive and support wheels, loads and speeds, such component belts wear to a point of practical uselessness, and must be replaced with costly frequency.

Thus, certain co-formed (or "homogenous") two-component belts of the prior art, such as a flat belt with timing structure, inherently include a single pitch line simply by virtue of their integral, unitary construction. However, the timing components of these known co-formed belts are lacking because they provide limited tracking abilities, produce increased noise or are prone to accelerated wear in high-speed applications, thus requiring frequent replacement which results in financial burden for the operator.

Attempts have been made to increase the functional longevity of such homogeneous component belts. In such attempts by others, where component belts have been formed by the co-forming of a belt component and a timing component initially with a single pitch line, the addition of necessary further component material laminations result in a composite belt still inherently presenting, undesirably, two separate and spaced pitch lines.

An improved timing component, such as that referred to as the "Eagle" timing belt, has been used in conveyor belts with the advantage of noise reduction. Such a component is described in U.S. Pat. Nos. 5,209,705; 5,421,789; 6,183,582; and 6,672,983, for example, each of which is expressly incorporated herein by reference. Advantages provided by the "Eagle" type timing belt include self-tracking abilities, improved durability in high speed applications, and reduced noise production.

As indicated above, a primary advantage offered by a two component co-formed belt where the timing component is of any variety, is inclusion of a belt component and a timing component while maintaining a single belt pitch line. The single belt pitch line allows for increased flexibility of the belt as compared to multiple-part manufactured belts having multiple pitch lines corresponding to multiple bonded layers. However, there are no now known conveyor belts having an "Eagle"-type timing component co-formed with a flat belt and together with other desired belt components, such as wear resistant components, without the finished belt having two pitch lines as discussed above.

Accordingly, it is desired to provide an improved conveyor belt having at least a belt component, and other timing components but without any undue wear or delamination resulting from two inherent pitch lines.

A further objective has been to provide a timed conveyor belt useful in a wide range of applications independent of the diameter of timed driving or support wheels.

A further objective of the invention has been to provide a composite conveyor belt having a single pitch line and with an "Eagle" style timing component and with antiwear layers but without the tendency to wear or delaminate due to having two spaced pitch lines.

A yet further objective of the invention has been to provide an improved composite belt having a flat belt component, a timing belt component, and at least one further layer or component but where the composite belt presents only one pitch line.

A further objective of the invention has been to provide a method of forming an improved composite conveyor belt having a belt component, a timing component and additional component layers, all with a single functional pitch line.

SUMMARY OF THE INVENTION

To these ends, a preferred embodiment of the invention includes a composite conveyor belt having an elongated timing component running along the belt and including first and second adjacent rows of obliquely angled teeth, and an additional material component, but where the completed composite belt has only a single pitch line. According to the invention, the belt component and the timing component are co-formed as an integral, homogeneous belt co-formed together with at least one additional material component layer, but having only a single pitch line wherein the elongated timing component has the configuration of the aforesaid "Eagle" timing component as described herein and in the aforesaid U.S. Patents, and which timing component is preferably centrally located, but can be optionally located along the belt in positions other than centrally and in one or more instances.

The composite belt is co-formed together with one or more fabric layers providing functional parameters to the belt but without the formation of any other pitch line than the single pitch line noted.

Further, the invention contemplates a method for forming the improved belt by co-forming the belt components together to produce an integral composite belt including a timing component having first and second adjacent rows of obliquely angled teeth and including only a single pitch line as described above.

DETAILED DESCRIPTION OF THE INVENTION

Figure 1:
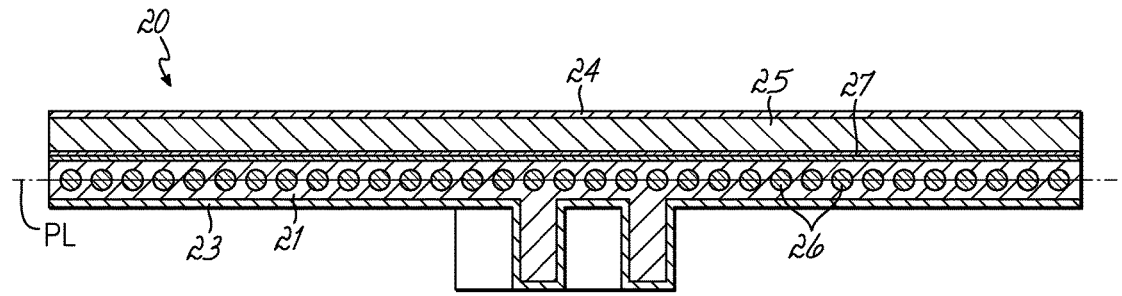
FIG. 1 is an illustrative cross-sectional end view of a belt according to the invention but with components enlarged and expanded disproportionately for clarity.
Figure 6:
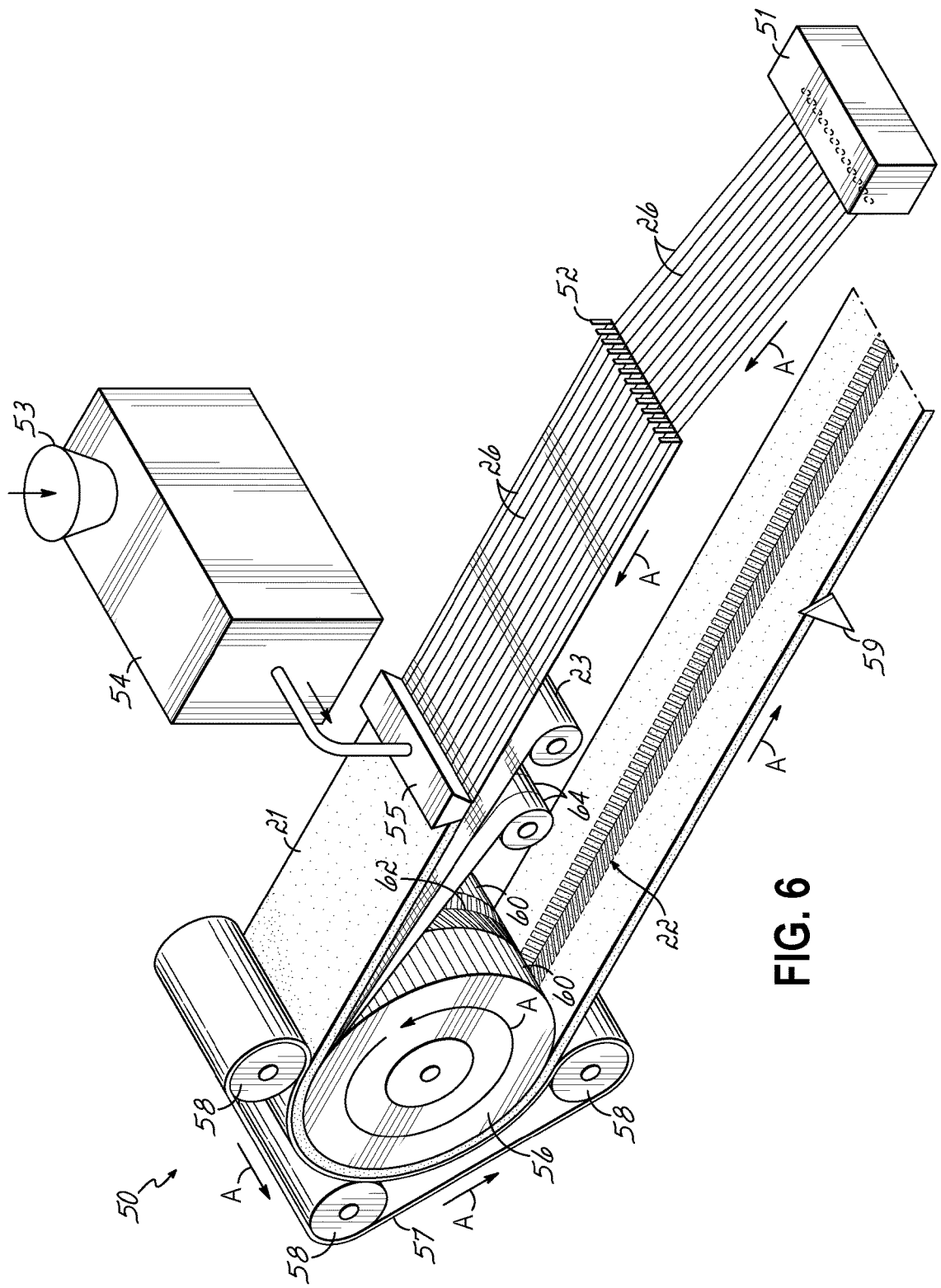
FIG. 6 is an isometric view graphically illustrating a process for making the belts of FIGS. 1-5.

Turning now to FIG. 1, a co-formed belt 20 according to one embodiment of the invention comprises a multiple component co-formed conveyor belt including a flat belt 21, an "Eagle" type toothed and "v"-shaped timing component 22 (graphically represented) co-formed therewith on an underneath side thereof of belt 21 and, a reinforcing wear resistant netting material 23 over the underside of belt component 21. A food compatible material layer 25 is adhered to an outer side of the belt component 21, and may be formed of a silicone or any other suitable material. Additionally, a reinforcement material 27, such as a netting, may be provided between the belt component 21 and the food compatible material layer 25. Optionally, a silicone layer 24 may be provided at the outer side of the co-formed belt 20 adjacent the food compatible material layer 25. As shown in FIG. 6, further reinforcing layers 64 of polyester or polyamide nylon or other suitable material can be co-formed with belt 20. Timing component 22 is preferably located centrally in the belt between its side edges, but can optionally be located in other than the central issue shown in the FIGS.

Flat belt 21 and timing component 22 are provided with a plurality of preferably parallel longitudinally extending reinforcing cords 26, as shown.

Significantly, the entire belt 20 is co-formed such that the entire belt defines only a single pitch line "PL" despite the multiple layers as described.

Components 21, 22 are formed from a polyester thermoplastic polyurethane of preferably 83 or 92 durometer. One or more timing components 22 can be co-formed in belt 20.

Reinforcement cords 26 comprise twisted Kevlar or Vectran cord.

The reinforcement netting 23 is preferably of polyester webbing for lateral stability. Additionally, the fabric substrate or netting 23 is preferably of low friction, anti-static, urethane impregnated polyester fabric or of polyamide nylon.

Figure 2:
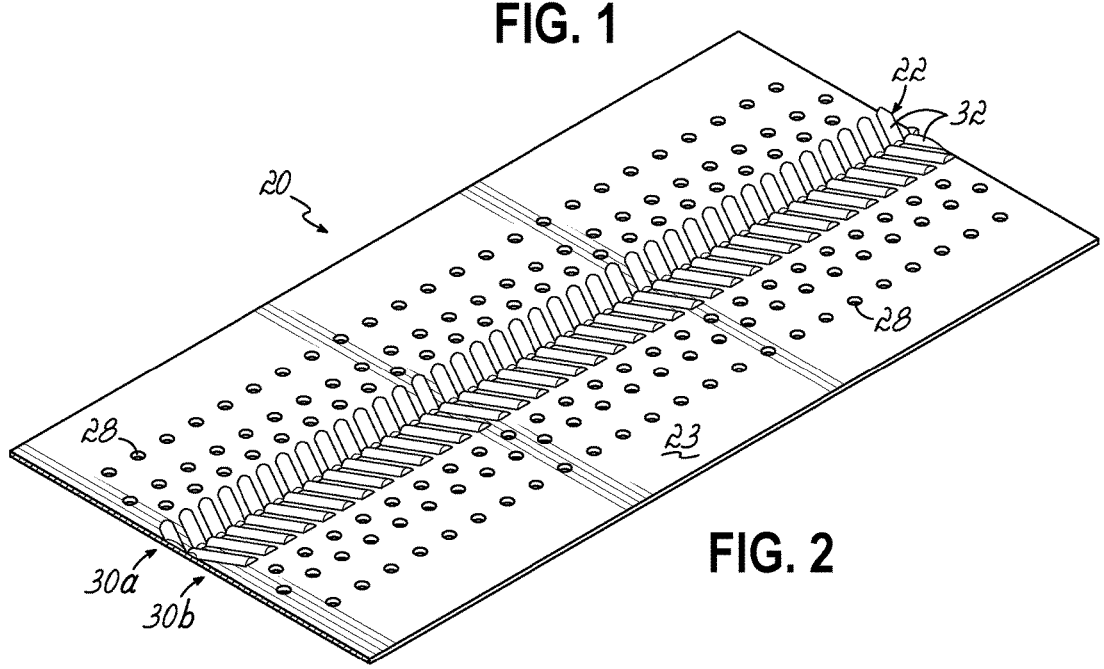
FIG. 2 is a graphic illustration of a belt as in FIG. 1 according to the invention and having vacuum holes for passing article holding vacuum therethrough.

FIG. 2 is a graphic illustration of the underside of one embodiment of belt 20 provided with vacuum holes 28 through which vacuum can be applied to hold articles on the belt as it moves.

Figure 3:
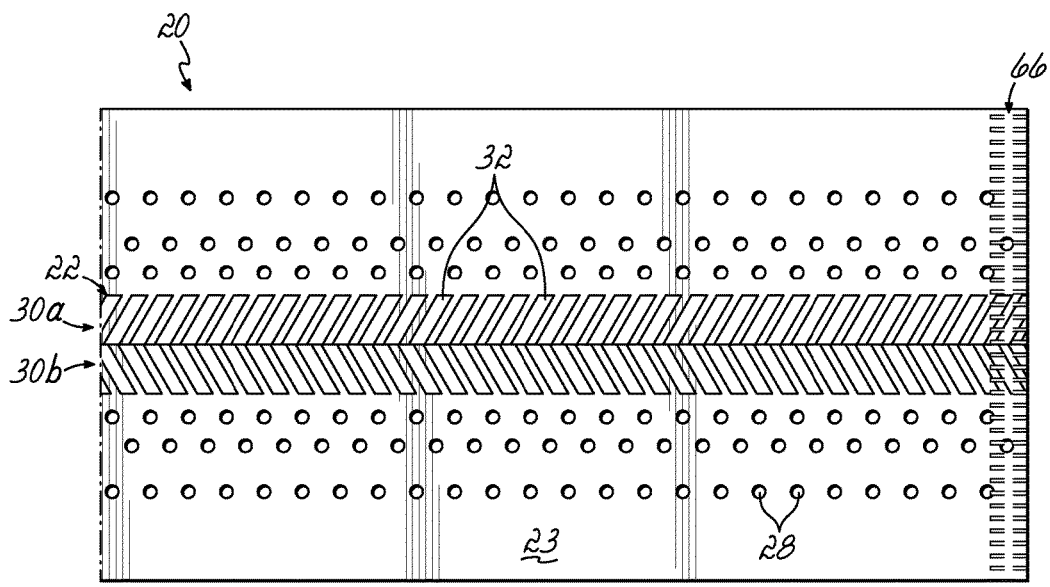
FIG. 3 is a top plan view of the belt of FIGS. 1 and 2.

FIG. 3 graphically depicts the underside of belt 20 of FIG. 3.

Figure 4:
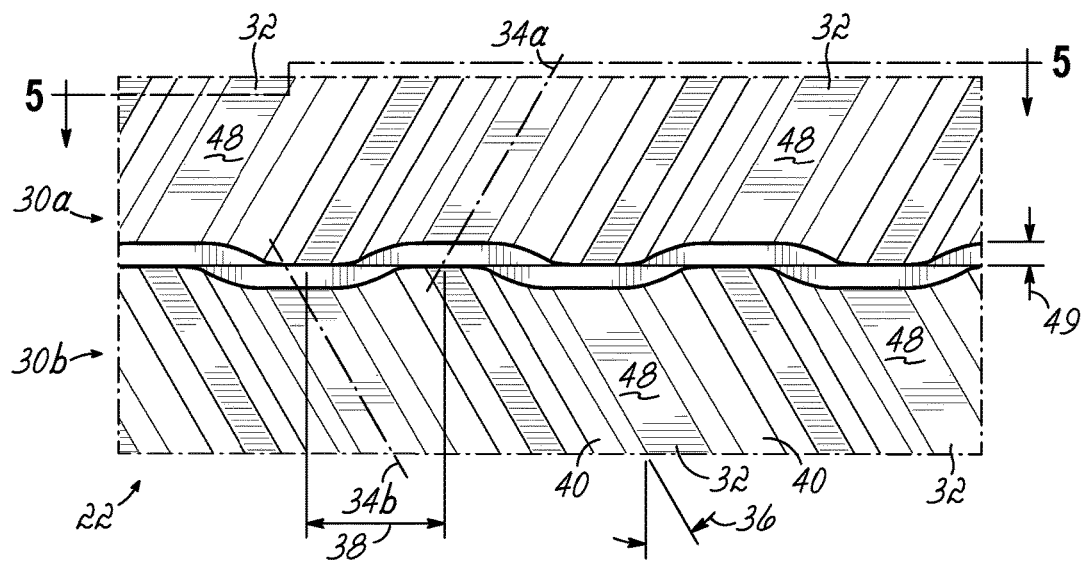
FIG. 4 is a partial top plan view of a timing component of the belt of FIGS. 1-3 with features thereof enlarged for clarity.
Figure 5:
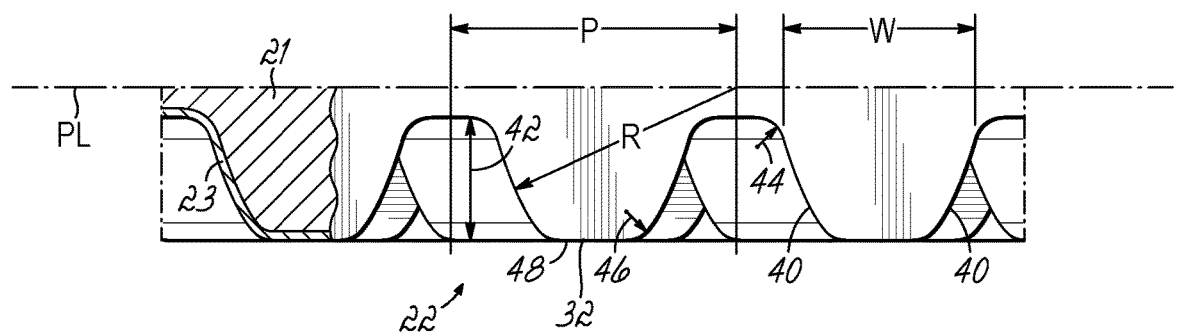
FIG. 5 is a side cross-sectional view of the belt taken along line 5-5 in FIG. 4.

Turning to FIGS. 4 and 5, additional details of the "Eagle"-type toothed timing component 22 of the illustrated embodiment are shown. As best shown in FIG. 4, the timing component 22 includes at least first and second transversely adjacent rows 30a and 30b of teeth 32 having centerlines 34a and 34b. The teeth 32 are uniformly spaced apart in the longitudinal direction by their pitch P and the teeth 32 extend, along their centerlines 34a, 34b, obliquely to the longitudinal direction such that the teeth 32 in the transversely adjacent rows 30a, 30b are at oppositely balanced angles 36 and the centerlines 34a, 34b are offset from each other by an offset distance 38. The offset distance 38 may range from 10% to 90% of the pitch P. For example, in one embodiment the offset distance 38 may range from 40% to 60% of the pitch P. In another embodiment, the offset distance 38 may be approximately 50% of the pitch P. Additionally, in one embodiment the oblique angle 36 may range from approximately 15 degrees to approximately 45 degrees.

As shown in FIG. 5, each tooth 32 has fore and aft flank surfaces 40 that describe an arc having a radius R and a center which may be positioned at the junction of the pitch line PL and a midway point between adjacent teeth 32, for example. The length of the radius R may be approximately 70% to 90% of the pitch P. The width W of the tooth 32 is determined by the length of the radius R and its center point. The tooth height 42 may be about 30% to 55% of the pitch P. To provide smooth transitions between the tooth flanks 40 and the land area defined as the surface between the teeth 32, a tooth root radius 44 is provided. A tooth tip blend radius 46 provides a smooth transition between the tooth flank 40 and the tooth tip 48. Further, the adjacent rows 30a, 30b of teeth 32 may be separated by a gap 49 for reducing frictional disengagement from a corresponding plurality of cavities formed on a drive pulley (not shown) during use.

Turning to FIG. 6, a linear, synchronous, thermoplastic polyurethane belt extrusion apparatus 50 and related process is illustrated. Apparatus 50 includes a creel 51 for dispensing cords 26, a cord divider or comb 52 for longitudinal alignment of cords 26; a hopper 53, extruder 54; an extruder head 55 for depositing a layer 21 of urethane; a chilled forming wheel 56; a flat forming belt entrained 57 on rollers 58 around wheel 56; slitters 59; and cord standoff projections 60 on wheel 56 for positioning extruded urethane and cords with respect to timing component 22 and with a single pitch line through the reinforcement cords 26. Also note the volume of cords 26 in the belt 20 can be varied as required.

Rollers 58 are positioned to hold flat forming belt 57 on the extruded polyurethane, pressing it against the wheel 56 for forming of belt 21, timing component 22, and other materials in the co-forming process.

Obliquely angled depressions 62 in wheel 56 co-form the teeth of the timing component 22 in the form of the "Eagle"-type, as described above, integral with flat belt component 21. In that regard, the depressions 62 may be formed with a size, shape, and arrangement reflective of the features of the "Eagle"-type timing component 22 shown and described herein. In particular, as shown in FIG. 6, the depressions 62 may be arranged in first and second adjacent rings for forming the corresponding first and second adjacent rows 30a, 30b of obliquely angled teeth 32 on the belt 20.

The wheel 56 may be provided with various alternative constructions suitable for forming a co-formed belt 20 having a timing component of various alternative configurations. For example, though not shown, an alternative embodiment of the co-formed belt 20 may include a timing component adjacent to each of the side edges of the belt 20, wherein either or both of the timing components are in the form of the "Eagle"-type timing component 22. For example, in one embodiment the co-formed belt 20 may include a first pair of adjacent rows 30*a*, 30*b* of obliquely angled teeth 32 adjacent a first side edge of the belt 20, and a second pair of adjacent rows 30*a*, 30*b* of obliquely angled teeth 32 adjacent a second side edge of the belt 20. The wheel 56 for forming such a belt 20 may include first and second pairs of adjacent rings of obliquely angled depressions.

Reinforcing netting 23 is introduced to the co-forming process, at wheel 56, beneath the urethane of belt 21, and where all the belt components as described are co-formed in one pass producing a co-formed belt 20 with only one pitch line.

One or more slitters 59 are used to cut the co-formed belt to selected width.

Direction of apparatus and belt components are illustrated by the directional arrows "A" in the drawings.

Any suitable belt size can be made as desired, with one example being a so-formed belt of about 150 millimeters to about 508 millimeters in width and about 3-6 millimeters in overall thickness. A preferred but variable timing component 22 is about 32 mm wide, preferably centered on belt 21.

As an option, further spools of wear resistant fabric 64 are also introduced to wheel 56 in the co-forming process, and under netting 23 to provide further wear resistance to the co-formed belt structure, and still presenting a single pitch line as noted above.

As a further option, the food contact compatible layer 25, as in FIG. 1, (not shown in FIG. 6) can be added to the belt 20 in the co-forming process, such as by co-extrusion with the other components, and preferably up to about 3 mm thick.

Finally, the belt so co-formed has its ends suitably connected such as by welding, finger splicing ends, indicated at 66, together to form an endless conveyor belt 20.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A conveyor belt including:
   a flat belt component;
   a timing component co-formed with said flat belt component on an underside of the flat belt component, said timing component including first and second adjacent rows of obliquely angled teeth;
   a layer of netting component on an underside of said flat belt component and over said timing component; and
   a plurality of reinforcing cords extending longitudinally through said flat belt component;
   wherein said flat belt component, said timing component, and said reinforcing cords are co-formed to define said conveyor belt having a single pitch line, said pitch line defined by said reinforcing cords.

2. A conveyor belt as in claim 1 further including a layer of material on top of said flat belt component and co-formed therewith.

3. A conveyor belt as in claim 1 further including a wear-resistant layer on an underneath side of said netting component and co-formed with said belt.

4. The conveyor belt of claim 1, wherein the teeth of the first and second adjacent rows are arranged at oppositely balanced oblique angles relative to a longitudinal direction of the conveyor belt.

5. The conveyor belt of claim 1, wherein the first and second rows of teeth extend longitudinally along the flat belt component.

6. The conveyor belt of claim 5, wherein the timing component extends laterally across only a portion of the flat belt component.

7. The conveyor belt of claim 6, wherein the teeth of the first and second adjacent rows are arranged at oppositely balanced oblique angles relative to a longitudinal direction of the conveyor belt.

8. An apparatus for forming a composite conveyor belt, said apparatus comprising:
   an apparatus for feeding a plurality of reinforcing cords,
   a cord arranging comb,
   an extruder for depositing a layer of thermoplastic material onto said cords,
   a forming wheel receiving said thermoplastic material layer and said cords and having a timing component forming feature for forming an integral timing component on one side of said thermoplastic material layer, said timing component forming feature including first and second adjacent rings of obliquely angled depressions that provide the integral timing component with corresponding first and second adjacent rows of obliquely angled teeth,
   an apparatus for introducing a first material layer onto said wheel under said thermoplastic material layer; and
   a flat forming belt partially extending about said wheel for urging said thermoplastic material layer, and said first material layer onto said wheel,
   said thermoplastic material layer, said reinforcing cords, and said first material layer defining said composite conveyor belt having a single pitch line, said pitch line defined by said reinforcing cords.

9. The apparatus as in claim 8 further including an apparatus feeding a second material layer onto said wheel under said first material layer.

10. The apparatus of claim 8, wherein the depressions of the first and second adjacent rings of the timing component forming feature are arranged at oppositely balanced oblique angles relative to a centerline of the timing component forming feature, the depressions thereby configured to form the teeth of the first and second adjacent rows of the timing component at oppositely balanced oblique angles relative to a longitudinal direction of the composite conveyor belt.

11. A method for co-forming a composite conveyor belt including the steps of:
   urging a thermoplastic material, reinforcing cords, and a first material layer onto a forming wheel,
   defining a composite conveyor belt on said wheel, said composite belt including a flat belt component having reinforcing cords therein and a multiple tooth timing component, said flat belt component and said multiple tooth timing component formed of thermoplastic material, said multiple tooth timing component including first and second adjacent rows of obliquely angled teeth, and co-forming said flat belt component, said multiple tooth timing component, and said first material layer into said composite conveyor belt having a single pitch line, said pitch line defined by said reinforcing cords.

12. A method as in claim 11 including co-forming a second material layer together integrally with said flat belt component, said multiple tooth timing component, and said first material layer.

13. The method of claim 11, further comprising:

forming the teeth of the first and second adjacent rows of the multiple tooth timing component at oppositely balanced oblique angles relative to a longitudinal direction of the composite conveyor belt.

14. A method of forming a composite conveyor belt having a single pitch line, the method including:

co-forming together a thermoplastic material, reinforcing cords, and a first material layer to define a composite conveyor belt having a flat belt component and a toothed timing component, said toothed timing component including first and second adjacent rows of obliquely angled teeth, said composite conveyor belt having a single pitch line, said pitch line defined by said reinforcing cords.

15. The method of claim 14, wherein the teeth of the toothed timing component are arranged at oppositely balanced oblique angles relative to a longitudinal direction of the composite conveyor belt.

* * * * *